(12) United States Patent
Wang

(10) Patent No.: US 12,219,359 B2
(45) Date of Patent: Feb. 4, 2025

(54) PSEUDO BASE STATION RECOGNITION METHOD AND APPARATUS, TERMINAL DEVICE AND NETWORK DEVICE

(71) Applicant: GUANGDONG OPPO MOBILE TELECOMMUNICATIONS CORP., LTD., Guangdong (CN)

(72) Inventor: Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 449 days.

(21) Appl. No.: 17/724,248

(22) Filed: Apr. 19, 2022

(65) Prior Publication Data

US 2022/0240092 A1    Jul. 28, 2022

Related U.S. Application Data

(63) Continuation of application No. PCT/CN2019/113954, filed on Oct. 29, 2019.

(51) Int. Cl.
*H04W 8/22* (2009.01)
*H04W 12/037* (2021.01)
(Continued)

(52) U.S. Cl.
CPC ........... *H04W 12/122* (2021.01); *H04W 8/22* (2013.01); *H04W 12/037* (2021.01);
(Continued)

(58) Field of Classification Search
CPC .... H04B 17/0082–3913; H04J 11/0069–0093; H04W 8/22–245;
(Continued)

(56) References Cited

U.S. PATENT DOCUMENTS

2018/0367303 A1    12/2018 Velev et al.
2020/0236554 A1*   7/2020 Lee ..................... H04W 12/122
(Continued)

FOREIGN PATENT DOCUMENTS

CN    108260126 A    7/2018

OTHER PUBLICATIONS

Ericsson, New solution: LIE-assisted false base station detection, 3GPP TSG-SA WG3 Meeting #86, S3-170463, Feb. 6-10, 2017. (2 pages) (Year: 2017).*

(Continued)

*Primary Examiner* — Timothy J Weidner
(74) *Attorney, Agent, or Firm* — Young Basile Hanlon & MacFarlane, P.C.

(57) ABSTRACT

Embodiments of the present application provide a pseudo base station recognition method and apparatus, a terminal device, and a network device. The method comprises: a terminal device receives first measurement configuration sent from a network device and reports to the network device the cell identification information of a first cell on the basis of the first measurement configuration, the cell identification information being used by the network device to determine whether the first cell is a pseudo base station cell and/or a recognized unconfigured neighboring cell; and the terminal device receives second measurement configuration sent from the network device and reports to the network device a hash value of system broadcast information of a second cell on the basis of the second measurement configuration, the hash value being used by the network device to determine whether the second cell is a pseudo base station cell.

19 Claims, 5 Drawing Sheets

A network device sends third configuration information to a terminal device, and the terminal device receives the third configuration information sent by the network device, and reports cell identification information and/or a HASH value of system broadcast information of a first cell to the network device based on the third measurement configuration; the cell identification information and/or the HASH value of system broadcast information being used for the network device to determine whether the first cell is a pseudo base station cell ⟵ 301

(51) Int. Cl.
*H04W 12/10* (2021.01)
*H04W 12/122* (2021.01)
*H04W 12/69* (2021.01)
*H04W 24/10* (2009.01)
*H04W 36/00* (2009.01)
*H04W 48/10* (2009.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ........... *H04W 12/10* (2013.01); *H04W 12/69* (2021.01); *H04W 24/10* (2013.01); *H04W 36/0061* (2013.01); *H04W 48/10* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ... H04W 12/009–80; H04W 24/02–10; H04W 36/0005–385; H04W 48/02–20; H04W 60/005–06; H04W 64/003–006; H04W 72/02–569; H04W 76/10–50; H04W 84/02–16; H04W 88/02–12; H04W 92/02–04; H04W 92/10; H04W 92/16; H04W 92/20
See application file for complete search history.

(56) References Cited

U.S. PATENT DOCUMENTS

2022/0104097 A1* 3/2022 Hu ..................... H04W 12/122
2022/0159493 A1* 5/2022 Geng .................. H04W 12/122

OTHER PUBLICATIONS

Internation Search Report with English Translation for PCT/CN2019/113954 mailed Jul. 24, 2020.
3GPP TSG SA WG3 (Security) Meeting #94; S3-190278; Jan. 28-Feb. 1, 2019, Kochi (India) revision of S3-19xabc.
3GPP TSG SA WG3 (Security) Meeting #94bis; S3-190776; Mar. 11-15, 2019, Kista (Sweden).
3GPP TSG-SA WG3 Meeting #94Ad-Hoc; S3-190985; Stockholm (Sweden), Mar. 11-15, 2019 merger of S3-190827, S3-190666, S3-190671.
3GPP TSG-SA WG3 Meeting #94Ad-Hoc; S3-190827; Stockholm (Sweden), Mar. 11-15, 2019 revision of S3-19xabc.
Extended European Search Report for EP Application 19950282.4 mailed Oct. 4, 2022. (11 pages).
Intel Corporation, False base station detection—feedback on SA3 LS, 3GPP TSG-RAN WG2 Meeting #107bis, R2-1912722, Oct. 14-18, 2019. (5 pages).
Ericsson, New solution: LIE-assisted false base station detection, 3GPP TSG-SA WG3 Meeting #86, S3-170463, Feb. 6-10, 2017. (2 pages).
3GPP TR 33.809 V0.6.0 (Aug. 2019); Technical Specification Group Services and System Aspects; Study on 5G Security Enhancement against False Base Stations; (Release 16). (54 pages).

* cited by examiner

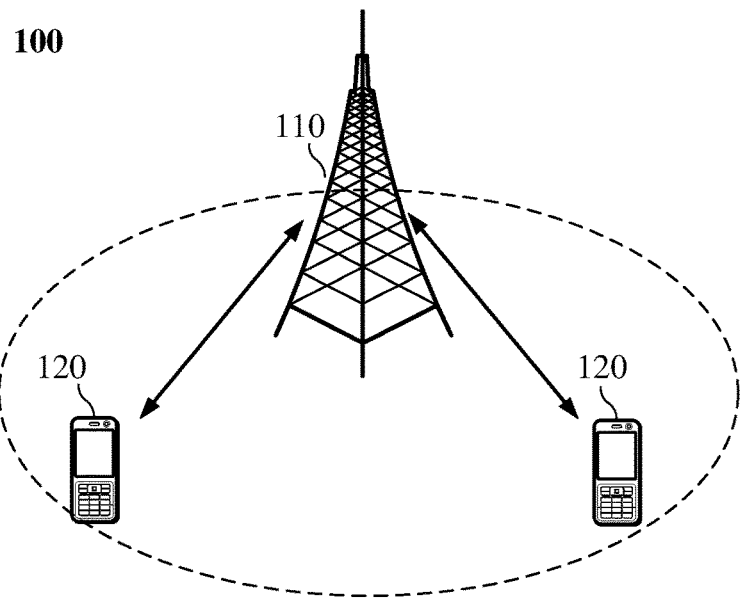

FIG. 1

| 201 | A network device sends a first measurement configuration to a terminal device, and the terminal device receives the first measurement configuration sent by the network device, and reports cell identification information of a first cell to the network device based on the first measurement configuration; the cell identification information being used for the network device to determine whether the first cell is a pseudo base station cell and/or to identify an unconfigured neighbor cell |

| 202 | The network device sends a second measurement configuration to the terminal device, the terminal device receives the second measurement configuration sent by the network device and reports a HASH value of system broadcast information of a second cell to the network device based on the second measurement configuration; the HASH value being used for the network device to determine whether the second cell is a pseudo base station cell; wherein the second cell and the first cell are the same cell or different cells |

FIG. 2

A network device sends third configuration information to a terminal device, and the terminal device receives the third configuration information sent by the network device, and reports cell identification information and/or a HASH value of system broadcast information of a first cell to the network device based on the third measurement configuration; the cell identification information and/or the HASH value of system broadcast information being used for the network device to determine whether the first cell is a pseudo base station cell    301

FIG. 3

A network device sends a fourth measurement configuration to a terminal device, the terminal device receives the fourth measurement configuration sent by the network device, calculates a HASH value of system broadcast information of a cell based on the fourth measurement configuration, and records HASH information; the terminal device reports the recorded HASH information to the network device; the HASH information being used for the network device to determine whether the cell is a pseudo base station cell    401

FIG. 4

A terminal device receives system broadcast information sent by a first cell, the system broadcast information including at least one code; the terminal device performs decryption and/or integrity protection verification of the at least one code by using a public secret key, and determines whether the first cell is a pseudo base station cell based on a decryption result and/or a verification result    501

FIG. 5

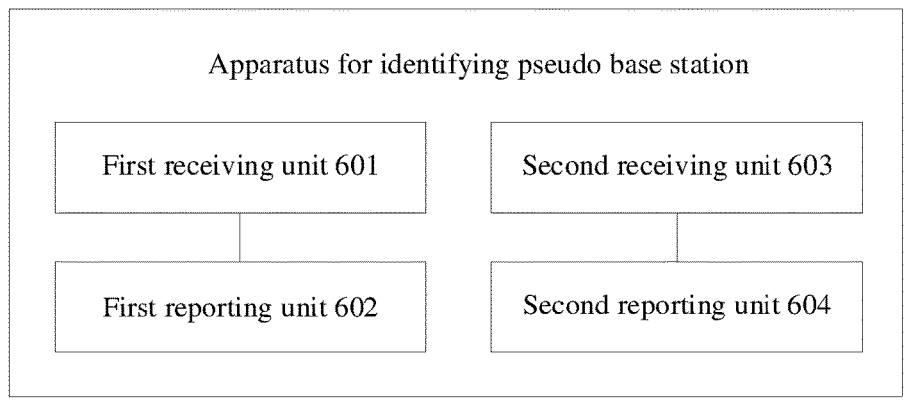

FIG. 6

PSEUDO BASE STATION RECOGNITION METHOD AND APPARATUS, TERMINAL DEVICE AND NETWORK DEVICE

CROSS-REFERENCE TO RELATED APPLICATION(S)

The present application is a continuation application of International PCT Application No. PCT/CN2019/113954, filed on Oct. 29, 2019, the entire content of which is hereby incorporated by reference.

TECHNICAL FIELD

Embodiments of the present application relate to the field of mobile communication technologies, and more particularly, to a method and apparatus for identifying a pseudo base station, a terminal device, and a network device.

BACKGROUND

With an arrival of the $5^{th}$ Generation (5G) mobile communication, a problem of a pseudo base station is becoming more and more prominent. When a pseudo base station device is running, a signal of a user's mobile phone is forced to connect to the device, which causes the mobile phone to be unable to use a service provided by an operator normally. In addition, it also causes the mobile phone to frequently update its location, which makes wireless network resources tense and causes network congestion, and affects the user's normal communication. At present, there is no good solution to solve the problem of the pseudo base station.

SUMMARY

Embodiments of the present application provide a method and apparatus for identifying a pseudo base station, a terminal device, and a network device.

An embodiment of the present application provides a method for identifying a pseudo base station, including: receiving, by a terminal device, a first measurement configuration sent by a network device, and reporting cell identification information of a first cell to the network device based on the first measurement configuration; wherein the cell identification information is used for the network device to determine whether the first cell is a pseudo base station cell and/or to identify an unconfigured neighbor cell; and receiving, by the terminal device, a second measurement configuration sent by the network device, and reporting a HASH value of system broadcast information of a second cell to the network device based on the second measurement configuration; wherein the HASH value is used for the network device to determine whether the second cell is a pseudo base station cell; wherein the second cell and the first cell are the same cell or different cells.

An embodiment of the present application provides a method for identifying a pseudo base station, including: receiving, by a terminal device, a third measurement configuration sent by a network device, and reporting cell identification information of a first cell and/or a HASH value of system broadcast information of the first cell to the network device based on the third measurement configuration; wherein the cell identification information and/or the HASH value of the system broadcast information are/is used for the network device to determine whether the first cell is a pseudo base station cell.

An embodiment of the present application provides a method for identifying a pseudo base station, including: receiving, by a terminal device, a fourth measurement configuration sent by a network device, calculating a HASH value of system broadcast information of a cell based on the fourth measurement configuration, and recording HASH information; and reporting, by the terminal device, the recorded HASH information to the network device; wherein the HASH information is used for the network device to determine whether the cell is a pseudo base station cell.

An embodiment of the present application provides a method for identifying a pseudo base station, including: receiving, by a terminal device, system broadcast information sent by a first cell, wherein the system broadcast information includes at least one code; and performing, by the terminal device, decryption and/or integrity protection verification of the at least one code by using a public secret key, and determining whether the first cell is a pseudo base station cell based on a decryption result and/or a verification result.

An embodiment of the present application provides a method for identifying a pseudo base station, including: sending, by a network device, a first measurement configuration to a terminal device, wherein the first measurement configuration is used for the terminal device to report cell identification information of a first cell; the cell identification information is used for the network device to determine whether the first cell is a pseudo base station cell and/or to identify an unconfigured neighbor cell; sending, by the network device, a second measurement configuration to the terminal device, wherein the second measurement configuration is used for the terminal device to report a HASH value of system broadcast information of a second cell; the HASH value is used for the network device to determine whether the second cell is a pseudo base station cell; wherein the second cell and the first cell are the same cell or different cells.

An embodiment of the present application provides a method for identifying a pseudo base station, including: sending, by a network device, a third measurement configuration to a terminal device, wherein the third measurement configuration is used for the terminal device to report cell identification information of a first cell and/or a HASH value of system broadcast information of the first cell; wherein the cell identification information and/or the HASH value of the system broadcast information are/is used for the network device to determine whether the first cell is a pseudo base station cell.

An embodiment of the present application provides a method for identifying a pseudo base station, including: sending, by a network device, a fourth measurement configuration to a terminal device, wherein the fourth measurement configuration is used for the terminal device to calculate a HASH value of system broadcast information of a cell and record HASH information, and to report the recorded HASH information to the network device; the HASH information is used for the network device to determine whether the cell is a pseudo base station cell.

An embodiment of the present application provides an apparatus for identifying a pseudo base station, which is applied to a terminal device, and the apparatus includes: a first receiving unit, configured to receive a first measurement configuration sent by a network device; a first reporting unit, configured to report cell identification information of a first cell to the network device based on the first measurement configuration; wherein the cell identification information is used for the network device to determine whether the first cell is a pseudo base station cell and/or to identify an unconfigured neighbor cell; a second receiving unit, configured to receive a second measurement configuration sent by the network device; a second reporting unit, configured to report a HASH value of system broadcast information of a second cell to the network device based on the second measurement configuration; wherein the HASH value is used for the network device to determine whether the second cell is a pseudo base station cell; wherein the second cell and the first cell are the same cell or different cells.

An embodiment of the present application provides an apparatus for identifying a pseudo base station, which is applied to a terminal device, and the apparatus includes: a receiving unit, configured to receive a third measurement configuration sent by a network device; a first reporting unit, configured to report cell identification information of a first cell and/or a HASH value of system broadcast information of the first cell to the network device based on the third measurement configuration; wherein the cell identification information and/or the HASH value of the system broadcast information are/is used for the network device to determine whether the first cell is a pseudo base station cell.

An embodiment of the present application provides an apparatus for identifying a pseudo base station, which is applied to a terminal device, and the apparatus includes: a receiving unit, configured to receive a fourth measurement configuration sent by a network device; a recording unit, configured to calculate a HASH value of system broadcast information of a cell based on the fourth measurement configuration and record HASH information; a first reporting unit, configured to report the recorded HASH information to the network device; wherein the HASH information is used for the network device to determine whether the cell is a pseudo base station cell.

An embodiment of the present application provides an apparatus for identifying a pseudo base station, which is applied to a terminal device, and the apparatus includes: a receiving unit, configured to receive system broadcast information sent by a first cell, wherein the system broadcast information includes at least one code; and a processing unit, configured to perform decryption and/or integrity protection verification of the at least one code by using a public secret key, and determine whether the first cell is a pseudo base station cell based on a decryption result and/or a verification result.

An embodiment of the present application provides an apparatus for identifying a pseudo base station, which is applied to a network device, and the apparatus includes: a first sending unit, configured to send a first measurement configuration to a terminal device, wherein the first measurement configuration is used for the terminal device to report cell identification information of a first cell; the cell identification information is used for the network device to determine whether the first cell is a pseudo base station cell and/or to identify an unconfigured neighbor cell; a second sending unit, configured to send a second measurement configuration to the terminal device, wherein the second measurement configuration is used for the terminal device to report a HASH value of system broadcast information of a second cell; the HASH value is used for the network device to determine whether the second cell is a pseudo base station cell; wherein the second cell and the first cell are the same cell or different cells.

An embodiment of the present application provides an apparatus for identifying a pseudo base station, which is applied to a network device, and the apparatus includes: a sending unit, configured to send a third measurement configuration to a terminal device, wherein the third measurement configuration is used for the terminal device to report cell identification information of a first cell and/or a HASH value of system broadcast information of the first cell; the cell identification information and/or the HASH value of the system broadcast information are/is used for the network device to determine whether the first cell is a pseudo base station cell.

An embodiment of the present application provides an apparatus for identifying a pseudo base station, which is applied to a network device, and the apparatus includes: a sending unit, configured to send a fourth measurement configuration to a terminal device, wherein the fourth measurement configuration is used for the terminal device to calculate a HASH value of system broadcast information of a cell and record HASH information, and to report the recorded HASH information to the network device; the HASH information is used for the network device to determine whether the cell is a pseudo base station cell.

An embodiment of the present application provides a terminal device, which includes a processor and a memory. The memory is configured to store a computer program, and the processor is configured to call and run the computer program stored in the memory to perform the method for identifying a pseudo base station described above.

An embodiment of the present application provides a network device, which includes a processor and a memory. The memory is configured to store a computer program, and the processor is configured to call and run the computer program stored in the memory to perform the method for identifying a pseudo base station described above.

An embodiment of the present application provides a chip, which is configured to achieve the method for identifying a pseudo base station described above.

Specifically, the chip includes a processor configured to call and run a computer program from a memory to enable a device installed with the chip to perform the method for identifying a pseudo base station described above.

An embodiment of the present application provides a computer readable storage medium, which is configured to store a computer program, and the computer program enables a computer to perform the method for identifying a pseudo base station described above.

An embodiment of the present application provides a computer program product including computer program instructions, and the computer program instructions enable a computer to perform the method for identifying a pseudo base station described above.

An embodiment of the present application provides a computer program that, when running on a computer, enables the computer to perform the method for identifying a pseudo base station described above.

Through the above technical solutions, a method for identifying a pseudo base station is provided. By reporting cell identification information and/or a HASH value of system broadcast information of a cell through a terminal device, a network side can accurately identify a pseudo base station, and then remove the pseudo base station, thus ensuring normal communication of a user and rights and interests of the user.

BRIEF DESCRIPTION OF DRAWINGS

Accompanying drawings described herein are intended to provide further understanding of the present application, and form a part of the present application. Illustrative embodiments of the present application and descriptions thereof are intended to explain the present application, but not constitute an inappropriate limitation to the present application. In the accompanying drawings, there are following drawings.

FIG. 1 is a schematic diagram of an architecture of a communication system according to an embodiment of the present application.

FIG. 2 is a first schematic flowchart of a method for identifying a pseudo base station according to an embodiment of the present application.

FIG. 3 is a second schematic flowchart of a method for identifying a pseudo base station according to an embodiment of the present application.

FIG. 4 is a third schematic flowchart of a method for identifying a pseudo base station according to an embodiment of the present application.

FIG. 5 is a fourth schematic flowchart of a method for identifying a pseudo base station according to an embodiment of the present application.

FIG. 6 is a first schematic diagram of a structural composition of an apparatus for identifying a pseudo base station according to an embodiment of the present application.

DETAILED DESCRIPTION

Figure 7:
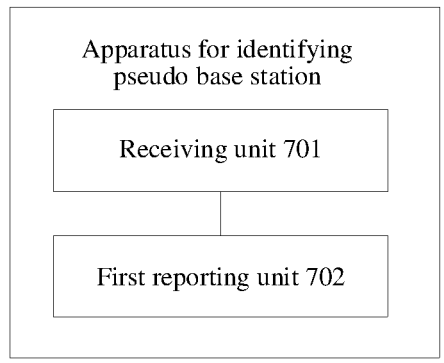
FIG. 7 is a second schematic diagram of a structural composition of an apparatus for identifying a pseudo base station according to an embodiment of the present application.

Technical solutions in embodiments of the present application will be described below with reference to the drawings in the embodiments of the present application. It is apparent that the embodiments described are just a part of embodiments of the present application, but not all of the embodiments of the present application. According to the embodiments of the present application, all other embodiments achieved by a person of ordinary skill in the art without making inventive efforts belong to the protection scope of the present application.

The technical solutions of the embodiments of the present application may be applied to various communication systems, such as a Long Term Evolution (LTE) system, an LTE Frequency Division Duplex (FDD) system, an LTE Time Division Duplex (TDD) system, a 5G communication system or a future communication system, etc.

Illustratively, a communication system 100 applied in an embodiment of the present application is shown in FIG. 1. The communication system 100 may include a network device 110. The network device 110 may be a device that communicates with a terminal 120 (or referred to as a communication terminal, or a terminal). The network device 110 may provide communication coverage for a specific geographical area, and may communicate with a terminal located within the coverage area. Optionally, the network device 110 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage area of the network device 110. The "terminal" as used herein includes, but is not limited to, an apparatus configured to receive/send communication signals via a wired line connection, for example, via a Public Switched Telephone Networks (PSTN), a Digital Subscriber Line (DSL), a digital cable, or a direct cable; and/or another data connection/network; and/or via a wireless interface, for example, for a cellular network, a Wireless Local Area Network (WLAN), a digital television network such as a Digital Video Broadcasting-Handheld (DVB-H) network, a satellite network, or an Amplitude Modulation-Frequency Modulation (AM-FM) broadcast transmitter; and/or another terminal; and/or an Internet of Things (IoT) device. A terminal configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, Internet/Intranet access, a Web browser, a memo pad, a calendar, and/or, a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal in a 5G network, or a terminal in future evolved Public Land Mobile Network (PLMN), etc.

Optionally, Device to Device (D2D) communication may be performed between terminals 120.

Optionally, a 5G communication system or a 5G network may also be referred to as a New Radio (NR) system or an NR network.

FIG. 1 illustrates exemplarily one network device and two terminals. Optionally, the communication system 100 may include a plurality of network devices, and other numbers of terminals may be included within a coverage area of each network device, which is not limited in the embodiments of the present application.

Optionally, the communication system 100 may also include another network entity, such as a network controller, a mobile management entity, or the like, which is not limited in the embodiments of the present application.

It should be understood that a device with a communication function in a network/system in the embodiments of the present application may also be referred to as a communication device. Taking the communication system 100 shown in FIG. 1 as an example, the communication device may include a network device 110 and terminal 120 which have communication functions, and the network device 110 and the terminal 120 may be specific devices described above, and will not be described repeatedly herein. The communication device may also include another device in the communication system 100, such as a network controller, a mobile management entity, and another network entity, etc., which is not limited in the embodiments of the present application.

It should be understood that the terms "system" and "network" may often be used interchangeably herein. The term "and/or" herein is an association relation describing associated objects only, indicating that three relations may exist, for example, A and/or B may indicate three cases: A alone, both A and B, and B alone. In addition, the symbol "/" in this document generally indicates that objects before and after the symbol "I" have an "or" relationship.

In order to facilitate understanding of the technical solutions of the embodiments of the present application, the technical solutions related to the embodiments of the present application will be explained below.

Automatic Neighbor Relation (ANR) Function

A Self-Organized Network (SON) has an ANR function. The ANR function means that an unconfigured neighbor cell may be found through a measurement report of a terminal device, so as to maintain integrity and effectiveness of a neighbor cell relation table and reduce abnormal neighbor cell handover, thereby improving network performance, avoiding manual operation, and reducing network operation and maintenance costs. An ANR process is as follows: a terminal device performs measurement and reports a Physical Cell Identity (PCI) of a strong cell, but a network side is unknown to the strong cell, so the network side sends a new measurement configuration to the terminal device, so that the terminal device reads system broadcast information identified through the PCI and obtains cell identification information, that is, Cell Global Identifier (CGI) information, from the system broadcast information. Then, the terminal device reports the CGI information to the network side, which is beneficial for the network side to add the unknown neighbor cell to the neighbor cell relation table.

Minimization of Drive Test (MDT)

An MDT technology is as follows: a network side uses a commercial terminal to report a specified measurement result to the network side, which is beneficial for the network side to achieve a purpose of network optimization. The MDT is classified as an immediate MDT and a logged MDT.

The immediate MDT is an MDT technology supported by a terminal device in a Radio Resource Control (RRC) connection state, while the logged MDT is an MDT technology in an RRC idle state or an RRC inactive state. For the logged MDT, the terminal device obtains measurement configuration information of the logged MDT through an RRC release message (which may also be called an RRC connection release message). When entering the RRC connection state again, a measurement result of the logged MDT is reported to the network side based on a request of the network side, which is used as an effective input of network optimization by the network side.

Pseudo Base Station

A pseudo base station is also called a fake base station. A device of the pseudo base station is a kind of high-tech instrument, which is generally composed of a host and a laptop computer. It may search for information of mobile phone cards within a certain radius around it through a Short Messaging Service (SMS) group sender, an SMS sender, and other related device, and arbitrarily use other people's mobile phone numbers to forcibly send short messages such as fraud and advertising to users' mobile phones by disguising as a base station of an operator. A main feature of the pseudo base station is that a number which is used for sending may be changed at will, and a number with a better tail number may be selected. When the device of the pseudo base station is running, a signal of a user's mobile phone is forced to connect to the device, which causes the mobile phone to be unable to use a service provided by an operator normally. Generally, the user of the mobile phone will return to the normal after 8~12 seconds of temporary off-line, and some mobile phones must be turned off and turned on before they may re-enter a network. In addition, it will also cause the user of the mobile phone to update its location frequently, which will make wireless network resources in this region tense and cause network congestion, and affect normal communication of the user.

In the NR, a terminal device calculates HASH values of a Master Information Block (MIB) and System Information Block (SIB) of a cell and reports them to a network side to assist the network side in identifying whether the cell is a pseudo base station cell. However, a specific reporting solution is not clear. Therefore, following technical solutions of the embodiments of the present application are proposed, which may support identification and discovery of a pseudo base station through a Radio Access Network 2 (RAN2) signaling.

FIG. 2 is a first schematic flowchart of a method for identifying a pseudo base station according to an embodiment of the present application. A technical solution of the embodiment of the present application is a solution for identifying a pseudo base station assisted by a terminal device side. As shown in FIG. 2, the method for identifying the pseudo base station includes the following acts 201 and 202.

In act 201, a network device sends a first measurement configuration to a terminal device, and the terminal device receives the first measurement configuration sent by the network device, and reports cell identification information of a first cell to the network device based on the first measurement configuration; wherein the cell identification information is used for the network device to determine whether the first cell is a pseudo base station cell and/or to identify an unconfigured neighbor cell.

In the embodiment of the present application, the network device may be a base station, such as a gNB.

In an optional embodiment of the present application, the cell identification information is CGI information.

In an optional embodiment of the present application, before the terminal device receives the first measurement configuration sent by the network device, the terminal device sends a measurement result to the network device, and the measurement result is used for the network device to determine whether the first cell is an unconfigured neighbor cell. Here, the unconfigured neighbor cell may also be called an unknown neighbor cell.

In a specific implementation, the technical solution of the embodiment of the present application is based on an ANR architecture. Specifically, 1) a terminal device performs measurement and reports a measurement result to a base station. Further, reporting of the measurement result may be reporting of an A-series measurement result or reporting of a B-series measurement result or reporting of a periodic measurement result. 2) The base station finds an unknown neighbor cell with strong signal quality (i.e., the first cell) according to the measurement result. 3) The base station sends a first measurement configuration to the terminal device. 4) The terminal device reports cell identification information (i.e., CGI information) of the first cell to the base station based on the first measurement configuration. Here, reporting of the cell identification information may also be called reporting of an ANR measurement result.

In an optional embodiment, when the first cell is an Evolved Universal Mobile Telecommunications System (UMTS) Terrestrial Radio Access (EUTRA) cell, CGI information (i.e., CGI-infoEUTRA) corresponding to the EUTRA cell is shown in Table 1 below. In another optional embodiment, when the first cell is an NR cell, CGI information corresponding to the NR cell (i.e., CGI-InfoNR) is shown in Table 2 below.

In the embodiment of the present application, the cell identification information is used for the network device to determine whether the first cell is a pseudo base station cell and/or to identify an unconfigured neighbor cell. Specifically, 1) the cell identification information is used for the network device to try to establish a connection with the first cell; wherein if establishment of the connection fails, it is determined that the first cell is a pseudo base station cell, and if establishment of the connection succeeds, it is determined that the first cell is not a pseudo base station cell; and/or, 2) the cell identification information is used for the network device to identify whether the first cell is an unconfigured neighbor cell based on a neighbor cell relation table.

In the above solution, the connection that the network device tries to establish with the first cell is called an X2 connection or an Xn connection. Specifically, after obtaining the CGI information reported by the terminal device, the network device tries to establish an X2/Xn connection to the first cell (i.e. an unknown cell) based on the CGI information. If establishment of the X2/Xn connection fails, the network device determines that the first cell may be a pseudo base station cell. If establishment of the X2/Xn connection succeeds, the network device considers that the first cell is not a pseudo base station cell (i.e. the first cell is a true base station cell).

In act 202, the network device sends a second measurement configuration to the terminal device, the terminal device receives the second measurement configuration sent by the network device and reports a HASH value of system broadcast information of a second cell to the network device based on the second measurement configuration; the HASH value is used for the network device to determine whether the second cell is a pseudo base station cell; wherein the second cell and the first cell are the same cell or different cells.

TABLE 1

```
-- ASN1START
-- TAG-CGI-Info-EUTRA-START
CGI-InfoEUTRA ::=                    SEQUENCE {
    cgi-info-EPC                         SEQUENCE {
        cgi-info-EPC-legacy                  CellAccessRelatedInfo-EUTRA-EPC,
        cgi-info-EPC-list                    SEQUENCE (SIZE (1..maxPLMN)) OF
CellAccessRelatedInfo-EUTRA-EPC   OPTIONAL
    }
OPTIONAL,
    cgi-info-5GC                         SEQUENCE (SIZE (1..maxPLMN)) OF
CellAccessRelatedInfo-EUTRA-5GC   OPTIONAL,
    freqBandIndicator                    FreqBandIndicatorEUTRA,
    multiBandInfoList                    MultiBandInfoListEUTRA
OPTIONAL,
    freqBandIndicatorPriority            ENUMERATED {true}
OPTIONAL
}
-- TAG-CGI-Info-EUTRA-STOP
-- ASN1STOP
```

TABLE 2

```
-- ASN1START
-- TAG-CGI-INFO-NR-START
CGI-InfoNR ::=                       SEQUENCE {
    plmn-IdentityInfoList                PLMN-IdentityInfoList       OPTIONAL,
    frequencyBandList                    MultiFrequencyBandListNR    OPTIONAL,
    noSIB1                               SEQUENCE {
        ssb-SubcarrierOffset                 INTEGER (0..15),
        pdcch-ConfigSIB1                     PDCCH-ConfigSIB1
    }                                                                OPTIONAL,
    ...
}
```

In the embodiment of the present application, the network device sends the second measurement configuration to the terminal device for a suspected pseudo base station cell (called the second cell) so that the terminal device reports the HASH value of the system broadcast information of the second cell, and then prepares to determine whether the second cell is a pseudo base station cell according to the HASH value. Here, the second cell may be the pseudo base station cell determined through the above act 201, a suspected pseudo base station cell determined through other approaches, or any cell that the network device wants to verify whether it is a pseudo base station cell. It should be noted that a purpose of the second measurement configuration is to instruct the terminal device to report a HASH value of system broadcast information of a designated cell or any cell.

In the embodiment of the present application, the first measurement configuration includes first indication information which is used for instructing the terminal device to report the cell identification information of the first cell; the second measurement configuration includes second indication information which is used for instructing the terminal device to report the HASH value of the system broadcast information of the second cell. Here, the first indication information is indication information for CGI reporting, and the second indication information is indication information for HASH reporting.

Specific implementations of the first indication information and the second indication information will be described below.

Implementation Mode 1

The first indication information and the second indication information are two pieces of independent indication information.

Specifically, indication information for HASH reporting is independent of indication information for CGI reporting. Referring to Table 3 below, wherein ReportCGI represents the indication information for CGI reporting and ReportHASH represents the indication information for HASH reporting.

indication information for CGI reporting, and reportHASH represents the indication information for HASH reporting.

TABLE 4-1

```
ReportConfigNR::=            SEQUENCE {
   reportType                CHOICE {
      periodical             PeriodicalReportConfig,
      eventTriggered         EventTriggerConfig,
      ...,
      reportCGI              ReportCGI,
      reportSFTD             ReportSFTD-NR
   }
}
ReportCGI ::=                SEQUENCE {
   cellForWhichToReportCGI   PhysCellId,
      reportHASH             ENUMERATED {true},
   mibSibBitmap              BIT STRING (SIZE (16)) optional
      ...
}
```

Further, optionally, the second measurement configuration further includes a first bitmap, wherein the first bitmap includes a plurality of bits, different bits of the plurality of bits correspond to different pieces of system broadcast information, and values of the bits are used for indicating whether to report HASH values of system broadcast information corresponding to the bits.

Here, the system broadcast information is, for example, a MIB and SIBs (such as SIB1, SIB2, and SIB3). After different pieces of system broadcast information are input into a HASH function, corresponding HASH values may be obtained, for example, a MIB and a SIB correspond to two HASH values.

In specific implementations, referring to the Table 3 and Table 4-1 above, the first bitmap is mibSibBitmap.

In the embodiment of the present application, after obtaining the second measurement configuration, the terminal device receives system broadcast information of a designated cell (that is, the second cell) according to the second measurement configuration, calculates a HASH value corresponding to the system broadcast information, and writes

TABLE 3

```
ReportConfigNR ::=           SEQUENCE {
   reportType                CHOICE {
      periodical             PeriodicalReportConfig,
      eventTriggered         EventTriggerConfig,
      ...,
      reportCGI              ReportCGI,
      reportSFTD             ReportSFTD-NR,
      ReportHASH             ReportHASH
   }
}
ReportCGI ::=                SEQUENCE {
   cellForWhichToReportCGI   PhysCellId,
      ...
}
ReportHASH ::=               SEQUENCE {
   cellForWhichToReportHASH  SEQUENCE (SIZE (1..maxCellHASH)) OF PhysCellId,
   mibSibBitmap              BIT STRING (SIZE (16)) optional
      ...
}
```

Implementation Mode 2

The first indication information contains the second indication information.

Specifically, the indication information for HASH reporting shares the indication information for CGI reporting. Refer to Table 4-1 below, wherein ReportCGI represents the the corresponding HASH value into a measurement report and reports the measurement report to the network device.

In the embodiment of the present application, the network device configures a corresponding measurement configuration based on a capability reported by the terminal device. For the embodiment of the present application, the terminal device reports first capability information to the network device, and the first capability information is used for indicating whether the terminal device supports calculation and reporting of a HASH value. Or, the terminal device reports second capability information and/or third capability information to the network device, wherein the second capability information is used for indicating whether the terminal device supports calculation and/or reporting of a HASH value in an MDT log mode, and the third capability information is used for indicating whether the terminal device supports calculation and reporting of a HASH value in an ANR mode.

Here, the calculation and reporting of the HASH value in the ANR mode is calculation and reporting of the HASH value achieved by the above solution (that is, based on the ANR architecture).

FIG. 3 is a second schematic flowchart of a method for identifying a pseudo base station according to an embodiment of the present application. A technical solution of the embodiment of the present application is a solution for identifying a pseudo base station assisted by a terminal device side. As shown in FIG. 3, the method for identifying the pseudo base station includes the following act 301.

In act 301, a network device sends a third measurement configuration to a terminal device, and the terminal device receives the third measurement configuration sent by the network device, and reports cell identification information of a first cell and/or a HASH value of system broadcast information of the first cell to the network device based on the third measurement configuration; the cell identification information and/or the HASH value of the system broadcast information are/is used for the network device to determine whether the first cell is a pseudo base station cell.

In the embodiment of the present application, the network device may be a base station, such as a gNB.

In an optional embodiment of the present application, the cell identification information is CGI information.

In an optional embodiment of the present application, before the terminal device receives the third measurement configuration sent by the network device, the terminal device sends a measurement result to the network device, and the measurement result is used for the network device to determine whether the first cell is an unconfigured neighbor cell. Here, the unconfigured neighbor cell may also be called an unknown neighbor cell.

In a specific implementation, the technical solution of the embodiment of the present application is based on an ANR architecture. Specifically, 1) a terminal device performs measurement and reports a measurement result to a base station. Further, reporting of the measurement result may be reporting of an A-series measurement result or reporting of a B-series measurement result or reporting of a periodic measurement result. 2) The base station finds an unknown neighbor cell with strong signal quality (i.e., the first cell) according to the measurement result. 3) The base station sends a third measurement configuration to the terminal device. 4) The terminal device reports cell identification information (i.e. CGI information) and/or a HASH value of system broadcast information of the first cell to the base station based on the third measurement configuration. Here, reporting of the cell identification information may also be called reporting of an ANR measurement result.

In the embodiment of the present application, the third measurement configuration includes first indication information and second indication information, wherein the first indication information is used for instructing the terminal device to report the cell identification information of the first cell, and the second indication information is used for instructing the terminal device to report the HASH value of the system broadcast information of the first cell. Here, the first indication information is indication information for CGI reporting, and the second indication information is indication information for HASH reporting.

Specific implementations of the first indication information and the second indication information will be described below.

The first indication information contains the second indication information.

Specifically, the indication information for HASH reporting shares the indication information for CGI reporting. Specifically, the indication information for HASH reporting shares the indication information for CGI reporting. Refer to Table 4-2 below, wherein ReportCGI represents the indication information for CGI reporting and reportHASH represents the indication information for HASH reporting.

TABLE 4-2

| ReportConfigNR ::= | SEQUENCE { |
| reportType | CHOICE { |
| periodical | PeriodicalReportConfig, |
| eventTriggered | EventTriggerConfig, |
| ..., | |
| reportCGI | ReportCGI, |
| reportSFTD | ReportSFTD-NR |
| } | |
| } | |
| ReportCGI ::= | SEQUENCE { |
| cellForWhichToReportCGI | PhysCellId, |
| reportHASH | ENUMERATED {true}, |
| mibSibBitmap | BIT STRING (SIZE (16)) optional |
| ... | |
| } | |

Further, optionally, the third measurement configuration further includes a first bitmap, the first bitmap includes a plurality of bits, different bits of the plurality of bits correspond to different pieces of system broadcast information, and values of the bits are used for indicating whether to report HASH values of system broadcast information corresponding to the bits.

Here, the system broadcast information is, for example, a MIB and SIBs (such as SIB1, SIB2, and SIB3). After different pieces of system broadcast information are input into a HASH function, corresponding HASH values may be obtained, for example, a MIB and a SIB correspond to two HASH values.

In a specific implementation, referring to the Table 4-2 above, the first bitmap is mibSibBitmap.

In the embodiment of the present application, after obtaining the third measurement configuration, the terminal device receives system broadcast information of a designated cell (i.e., the first cell) according to the third measurement configuration, and reports CGI information (i.e., an ANR measurement result) and/or the HASH value of the system broadcast information of the first cell to the network device.

In the embodiment of the present application, the network device configures a corresponding measurement configuration based on a capability reported by the terminal device. For the embodiment of the present application, the terminal device reports first capability information to the network device, and the first capability information is used for indicating whether the terminal device supports calculation and reporting of a HASH value. Or, the terminal device reports second capability information and/or third capability information to the network device, wherein the second capability information is used for indicating whether the terminal device supports calculation and/or reporting of a HASH value in an MDT log mode, and the third capability information is used for indicating whether the terminal device supports calculation and reporting of a HASH value in an ANR mode.

Here, the calculation and reporting of the HASH value in the ANR mode is calculation and reporting of the HASH value achieved by the above solution (that is, based on the ANR architecture).

FIG. 4 is a third schematic flowchart of a method for identifying a pseudo base station according to an embodiment of the present application. A technical solution of the embodiment of the present application is a solution for identifying a pseudo base station assisted by a terminal device side. As shown in FIG. 4, the method for identifying the pseudo base station includes the following act 401.

In act 401, a network device sends a fourth measurement configuration to a terminal device, the terminal device receives the fourth measurement configuration sent by the network device, calculates a HASH value of system broadcast information of a cell based on the fourth measurement configuration, and records HASH information; the terminal device reports the recorded HASH information to the network device; the HASH information is used for the network device to determine whether the cell is a pseudo base station cell.

In the embodiment of the present application, the network device may be a base station, such as a gNB.

In an optional embodiment of the present application, the fourth measurement configuration includes at least one of: a quantity of cells of which HASH information needs to be recorded, a list of the cells of which HASH information needs to be recorded, frequency information of the cells of which HASH information needs to be recorded, frequency list information of the cells of which HASH information needs to be recorded, a measurement time length, absolute time, indication information of whether to report location information, and indication information of system broadcast information of which a HASH value needs to be calculated.

Here, if the fourth measurement configuration includes the list of the cells of which HASH information needs to be recorded, the cells are identified through a CGI or a frequency plus a PCI (frequency+PCI).

Further, optionally, the indication information of the system broadcast information of which the HASH value needs to be calculated includes a first bitmap; wherein the first bitmap includes a plurality of bits, different bits of the plurality of bits correspond to different pieces of system broadcast information, and values of the bits are used for indicating whether to calculate HASH values of system broadcast information corresponding to the bits.

Here, the system broadcast information is, for example, a MIB and SIBs (such as SIB1, SIB2, and SIB3). After different pieces of system broadcast information are input into a HASH function, corresponding HASH values may be obtained, for example, a MIB and a SIB correspond to two HASH values.

In a specific implementation, the technical solution of the embodiment of the present application is based on a logged MDT architecture. Specifically, 1) the terminal device receives an RRC release message (which may also be called an RRC connection release message) sent by the network device, and the fourth measurement configuration is carried in the RRC release message. 2) After receiving the RRC release message, the terminal device enters an RRC idle state or an RRC inactive state. In a case where the terminal device is in the RRC idle state or the RRC inactive state, a HASH value of system broadcast information of a cell is calculated based on the fourth measurement configuration and HASH information is recorded; or, in a case where the terminal device is in the RRC idle state or the RRC inactive state, after cell reselection, a HASH value of system broadcast information of a current resident cell is calculated based on the fourth measurement configuration and HASH information is recorded. 3) In a case where the terminal device is in the RRC connection state, it is indicated to the network device that a recorded HASH value exists in the terminal device; and after receiving a request message sent by the network device, the terminal device reports the recorded HASH information to the network device.

In an optional embodiment of the present application, the HASH information recorded by the terminal device includes at least one of the following: HASH information of at least one cell, cell identification information corresponding to at least one cell, frequency information of at least one cell, absolute time information, relative time information, and location information.

Further, optionally, the cell identification information is CGI information.

According to the technical solution of the embodiment of the present application, considering a problem of log overflow, a following solution is proposed: if the terminal device has recorded HASH information of a specified quantity of cells, the terminal device stops measuring and/or stopping a timer; or, the terminal device continues measurement and overwrites previously recorded information based on a measurement result.

According to the technical solution of the embodiment of the present application, considering a problem of stopping a recording action, a following solution is proposed: if the terminal device performs an RRC establishment procedure (which may also be called an RRC connection establishment procedure) or an RRC recovery procedure (which may also be called an RRC connection recovery procedure) for a first cell in a process of recording information, the terminal device stops recording information after performing Access Stratum (AS) or Non-Access Stratum (NAS) security verification; if the terminal device fails to perform the RRC establishment procedure or the RRC recovery procedure, indication information that the first cell is a pseudo base station is recorded.

In the above solution, the indication information that the first cell is a pseudo base station is recorded, for example, it may indicate at least one of the following: an RRC recovery message (MSG4) integrity protection verification failure in the RRC recovery procedure, an AS security activation failure or a NAS layer authentication failure in the RRC connection establishment procedure, and timer timeout.

In the embodiment of the present application, the network device configures a corresponding measurement configuration based on a capability reported by the terminal device. For the embodiment of the present application, the terminal device reports first capability information to the network device, and the first capability information is used for indicating whether the terminal device supports calculation and reporting of a HASH value. Or, the terminal device reports second capability information and/or third capability information to the network device, wherein the second capability information is used for indicating whether the terminal device supports calculation and/or reporting of a HASH value in an MDT log mode, and the third capability information is used for indicating whether the terminal device supports calculation and reporting of a HASH value in an ANR mode.

Here, the calculation and reporting of the HASH value in an MDT log mode is calculation and reporting of the HASH value achieved by the above solution (that is, based on the logged MDT architecture).

FIG. 5 is a fourth schematic flowchart of a method for identifying a pseudo base station according to an embodiment of the present application. A technical solution of the embodiment of the present application is a solution for identifying a pseudo base station assisted by a network side. As shown in FIG. 5, the method for identifying the pseudo base station includes the following act 501.

In act 501, a terminal device receives system broadcast information sent by a first cell, wherein the system broadcast information includes at least one code; the terminal device performs decryption and/or integrity protection verification of the at least one code by using a public secret key, and determines whether the first cell is a pseudo base station cell based on a decryption result and/or a verification result.

Further, in an optional embodiment, if the terminal device determines that the first cell is a pseudo base station cell based on the decryption result and/or the verification result, the terminal device reports at least one piece of the following information to the network device: frequency information of the first cell, cell identification information of the first cell, cell frequency information before cell reselection, cell identification information before cell reselection, location information, time information, and neighbor cell measurement information.

Further, optionally, the cell identification information is CGI information.

FIG. 6 is a first schematic diagram of a structural composition of an apparatus for identifying a pseudo base station according to an embodiment of the present application, which is applied to a terminal device. As shown in FIG. 6, the apparatus for identifying the pseudo base station includes: a first receiving unit 601, configured to receive a first measurement configuration sent by a network device; a first reporting unit 602, configured to report cell identification information of a first cell to the network device based on the first measurement configuration; wherein the cell identification information is used for the network device to determine whether the first cell is a pseudo base station cell and/or to identify an unconfigured neighbor cell; a second receiving unit 603, configured to receive a second measurement configuration sent by the network device; and a second reporting unit 604, configured to report a HASH value of system broadcast information of a second cell to the network device based on the second measurement configuration; wherein the HASH value is used for the network device to determine whether the second cell is a pseudo base station cell; wherein the second cell and the first cell are the same cell or different cells.

In an optional embodiment, the first measurement configuration includes first indication information which is used for instructing the terminal device to report the cell identification information of the first cell; the second measurement configuration includes second indication information which is used for instructing the terminal device to report the HASH value of the system broadcast information of the second cell.

In an optional embodiment, the first indication information and the second indication information are two pieces of independent indication information; or, the first indication information contains the second indication information.

In an optional embodiment, the second measurement configuration further includes a first bitmap, wherein the first bitmap includes a plurality of bits, different bits of the plurality of bits correspond to different pieces of system broadcast information, and values of the bits are used for indicating whether to report HASH values of system broadcast information corresponding to the bits.

In an optional embodiment, the cell identification information being used for the network device to determine whether the first cell is a pseudo base station cell and/or to identify an unconfigured neighbor cell includes: the cell identification information is used for the network device to try to establish a connection with the first cell; wherein if establishment of the connection fails, it is determined that the first cell is a pseudo base station cell, and if establishment of the connection succeeds, it is determined that the first cell is not a pseudo base station cell; and/or, the cell identification information is used for the network device to identify whether the first cell is an unconfigured neighbor cell based on a neighbor cell relation table.

In an optional embodiment, the apparatus further includes: a sending unit (not shown in the figure), configured to send a measurement result to the network device, wherein the measurement result is used for the network device to determine whether the first cell is an unconfigured neighbor cell.

In an optional embodiment, the apparatus further includes: a third reporting unit (not shown in the figure), configured to report first capability information to the network device, wherein the first capability information is used for indicating whether the terminal device supports calculation and reporting of a HASH value.

In an optional embodiment, the apparatus further includes: a third reporting unit, configured to report second capability information and/or third capability information to the network device, wherein the second capability information is used for indicating whether the terminal device supports calculation and/or reporting of a HASH value in an MDT log mode, and the third capability information is used for indicating whether the terminal device supports calculation and reporting of a HASH value in an ANR mode.

Those skilled in the art should understand that relevant description of the apparatus for identifying the pseudo base station of the embodiment of the present application may be understood with reference to relevant description of the method for identifying the pseudo base station of the embodiment of the present application.

FIG. 7 is a second schematic diagram of a structural composition of an apparatus for identifying a pseudo base station according to an embodiment of the present application, which is applied to a terminal device. As shown in FIG. 7, the apparatus for identifying the pseudo base station includes: a receiving unit 701, configured to receive a third measurement configuration sent by a network device; a first reporting unit 702, configured to report cell identification information and/or a HASH value of system broadcast information of a first cell to the network device based on the third measurement configuration; wherein the cell identification information and/or the HASH value of system broadcast information are/is used for the network device to determine whether the first cell is a pseudo base station cell.

In an optional embodiment, the third measurement configuration includes first indication information and second indication information, wherein the first indication information is used for instructing the terminal device to report the cell identification information of the first cell, and the second indication information is used for instructing the terminal device to report the HASH value of the system broadcast information of the first cell.

In an optional embodiment, the first indication information contains the second indication information.

In an optional embodiment, the third measurement configuration further includes a first bitmap, wherein the first bitmap includes a plurality of bits, different bits of the plurality of bits correspond to different pieces of system broadcast information, and values of the bits are used for indicating whether to report HASH values of system broadcast information corresponding to the bits.

In an optional embodiment, the apparatus further includes: a sending unit (not shown in the figure), configured to send a measurement result to the network device, wherein the measurement result is used for the network device to determine whether the first cell is an unconfigured neighbor cell.

In an optional embodiment, the apparatus further includes: a second reporting unit (not shown in the figure), configured to report first capability information to the network device, wherein the first capability information is used for indicating whether the terminal device supports calculation and reporting of a HASH value.

In an optional embodiment, the apparatus further includes: a second reporting unit, configured to report second capability information and/or third capability information to the network device, wherein the second capability information is used for indicating whether the terminal device supports calculation and/or reporting of a HASH value in an MDT log mode, and the third capability information is used for indicating whether the terminal device supports calculation and reporting of a HASH value in an ANR mode.

Those skilled in the art should understand that relevant description of the apparatus for identifying the pseudo base station of the embodiment of the present application may be understood with reference to relevant description of the method for identifying the pseudo base station of the embodiment of the present application.

Figure 8:
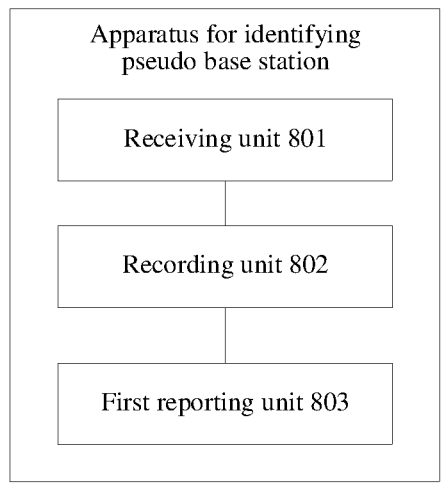
FIG. 8 is a third schematic diagram of a structural composition of an apparatus for identifying a pseudo base station according to an embodiment of the present application.

FIG. 8 is a third schematic diagram of a structural composition of an apparatus for identifying a pseudo base station according to an embodiment of the present application, which is applied to a terminal device. As shown in FIG. 8, the apparatus for identifying the pseudo base station includes: a receiving unit 801, configured to receive a fourth measurement configuration sent by a network device; a recording unit 802, configured to calculate a HASH value of system broadcast information of a cell based on the fourth measurement configuration and record HASH information; and a first reporting unit 803, configured to report the recorded HASH information to the network device; wherein the HASH information is used for the network device to determine whether the cell is a pseudo base station cell.

In an optional embodiment, the fourth measurement configuration includes at least one of: a quantity of cells of which HASH information needs to be recorded, a list of the cells of which HASH information needs to be recorded, frequency information of the cells of which HASH information needs to be recorded, frequency list information of the cells of which HASH information needs to be recorded, a measurement time length, absolute time, indication information of whether to report location information, and indication information of system broadcast information of which a HASH value needs to be calculated.

In an optional embodiment, the indication information of the system broadcast information of which the HASH value needs to be calculated includes a first bitmap; wherein the first bitmap includes a plurality of bits, different bits of the plurality of bits correspond to different pieces of system broadcast information, and values of the bits are used for indicating whether to calculate HASH values of system broadcast information corresponding to the bits.

In an optional embodiment, the receiving unit 801 is configured to receive an RRC release message sent by the network device, wherein the fourth measurement configuration is carried in the RRC release message.

In an optional embodiment, the recording unit 802 is configured to, in a case where the terminal device is in an RRC idle state or an RRC inactive state, calculate the HASH value of the system broadcast information of the cell based on the fourth measurement configuration and record the HASH information; or, in a case where the terminal device is in the RRC idle state or the RRC inactive state, after cell reselection, calculate the HASH value of the system broadcast information of a current resident cell based on the fourth measurement configuration and record the HASH information.

In an optional embodiment, the first reporting unit 803 is configured to indicate to the network device that a recorded HASH value exists in the terminal device in a case where the terminal device is in an RRC connection state; and report the recorded HASH information to the network device after the terminal device receives a request message sent by the network device.

In an optional embodiment, the HASH information recorded by the terminal device includes at least one of the following: HASH information of at least one cell, cell identification information corresponding to at least one cell, frequency information of at least one cell, absolute time information, relative time information, and location information.

In an optional embodiment, the apparatus further includes: a processing unit (not shown in the figure), configured to stop measuring and/or stop a timer if the recording unit has recorded HASH information of a specified quantity of cells; or, continue measurement and overwrite previously recorded information based on a measurement result.

In an optional embodiment, the apparatus further includes: a processing unit, configured to stop recording information after performing AS or NAS security verification if the terminal device performs an RRC establishment procedure or an RRC recovery procedure for a first cell in a process of recording information; and record indication information that the first cell is a pseudo base station if the terminal device fails to perform the RRC establishment procedure or the RRC recovery procedure.

In an optional embodiment, the apparatus further includes: a second reporting unit (not shown in the figure), configured to report first capability information to the network device, wherein the first capability information is used for indicating whether the terminal device supports calculation and reporting of a HASH value.

In an optional embodiment, the apparatus further includes: a second reporting unit, configured to report second capability information and/or third capability information to the network device, wherein the second capability information is used for indicating whether the terminal device supports calculation and/or reporting of a HASH value in an MDT log mode, and the third capability information is used for indicating whether the terminal device supports calculation and reporting of a HASH value in an ANR mode.

Those skilled in the art should understand that relevant description of the apparatus for identifying the pseudo base station of the embodiment of the present application may be understood with reference to relevant description of the method for identifying the pseudo base station of the embodiment of the present application.

Figure 9:
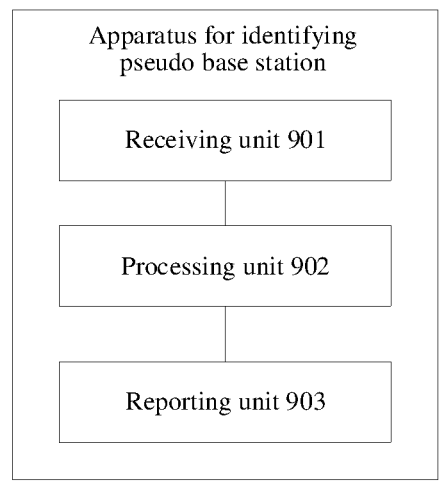
FIG. 9 is a fourth schematic diagram of a structural composition of an apparatus for identifying a pseudo base station according to an embodiment of the present application.

FIG. 9 is a fourth schematic diagram of a structural composition of an apparatus for identifying a pseudo base station according to an embodiment of the present application, which is applied to a terminal device. As shown in FIG. 9, the apparatus for identifying the pseudo base station includes: a receiving unit 901, configured to receive system broadcast information sent by a first cell, wherein the system broadcast information includes at least one code; a processing unit 902, configured to perform decryption and/or integrity protection verification of the at least one code by using a public secret key, and determine whether the first cell is a pseudo base station cell based on a decryption result and/or a verification result.

In an optional embodiment, the apparatus further includes: a reporting unit 903, configured to report at least one piece of the following information to the network device if it is determined that the first cell is a pseudo base station cell based on the decryption result and/or the verification result: frequency information of the first cell, cell identification information of the first cell, cell frequency information before cell reselection, cell identification information before cell reselection, location information, time information, and neighbor cell measurement information.

Those skilled in the art should understand that relevant description of the apparatus for identifying the pseudo base station of the embodiment of the present application may be understood with reference to relevant description of the method for identifying the pseudo base station of the embodiment of the present application.

Figure 10:
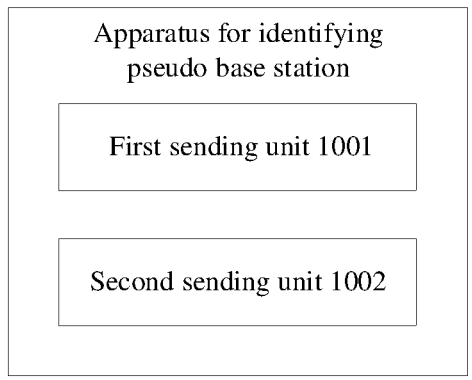
FIG. 10 is a fifth schematic diagram of a structural composition of an apparatus for identifying a pseudo base station according to an embodiment of the present application.

FIG. 10 is a fifth schematic diagram of a structural composition of an apparatus for identifying a pseudo base station according to an embodiment of the present application, which is applied to a network device. As shown in FIG. 10, the apparatus for identifying the pseudo base station includes: a first sending unit 1001, configured to send a first measurement configuration to a terminal device, wherein the first measurement configuration is used for the terminal device to report cell identification information of a first cell; the cell identification information is used for the network device to determine whether the first cell is a pseudo base station cell and/or to identify an unconfigured neighbor cell; and a second sending unit 1002, configured to send a second measurement configuration to the terminal device, wherein the second measurement configuration is used for the terminal device to report a HASH value of system broadcast information of a second cell; the HASH value is used for the network device to determine whether the second cell is a pseudo base station cell; wherein the second cell and the first cell are the same cell or different cells.

In an optional embodiment, the first measurement configuration includes first indication information which is used for instructing the terminal device to report the cell identification information of the first cell; the second measurement configuration includes second indication information which is used for instructing the terminal device to report the HASH value of the system broadcast information of the second cell.

In an optional embodiment, the first indication information and the second indication information are two pieces of independent indication information; or, the first indication information contains the second indication information.

In an optional embodiment, the second measurement configuration further includes a first bitmap, wherein the first bitmap includes a plurality of bits, different bits of the plurality of bits correspond to different pieces of system broadcast information, and values of the bits are used for indicating whether to report HASH values of system broadcast information corresponding to the bits.

In an optional embodiment, the cell identification information being used for the network device to determine whether the first cell is a pseudo base station cell and/or to identify an unconfigured neighbor cell includes: the cell identification information is used for the network device to try to establish a connection with the first cell; wherein if establishment of the connection fails, it is determined that the first cell is a pseudo base station cell, and if establishment of the connection succeeds, it is determined that the first cell is not a pseudo base station cell; and/or, the cell identification information is used for the network device to identify whether the first cell is an unconfigured neighbor cell based on a neighbor cell relation table.

Those skilled in the art should understand that relevant description of the apparatus for identifying the pseudo base station of the embodiment of the present application may be understood with reference to relevant description of the method for identifying the pseudo base station of the embodiment of the present application.

Figure 11:
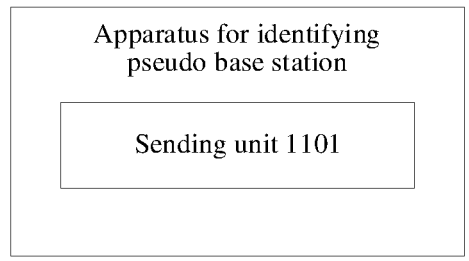
FIG. 11 is a sixth schematic diagram of a structural composition of an apparatus for identifying a pseudo base station according to an embodiment of the present application.

FIG. 11 is a sixth schematic diagram of a structural composition of an apparatus for identifying a pseudo base station according to an embodiment of the present application, which is applied to a network device. As shown in FIG. 11, the apparatus for identifying the pseudo base station includes: a sending unit 1101, configured to send a third measurement configuration to a terminal device, wherein the third measurement configuration is used for the terminal device to report cell identification information and/or a HASH value of system broadcast information of a first cell; the cell identification information and/or the HASH value of the system broadcast information are/is used for the network device to determine whether the first cell is a pseudo base station cell.

In an optional embodiment, the third measurement configuration includes first indication information and second indication information, wherein the first indication information is used for instructing the terminal device to report the cell identification information of the first cell, and the second indication information is used for instructing the terminal device to report the HASH value of the system broadcast information of the first cell.

In an optional embodiment, the first indication information contains the second indication information.

In an optional embodiment, the third measurement configuration further includes a first bitmap, wherein the first bitmap includes a plurality of bits, different bits of the plurality of bits correspond to different pieces of system broadcast information, and values of the bits are used for indicating whether to report HASH values of system broadcast information corresponding to the bits.

Those skilled in the art should understand that relevant description of the apparatus for identifying the pseudo base station of the embodiment of the present application may be understood with reference to relevant description of the method for identifying the pseudo base station of the embodiment of the present application.

Figure 12:
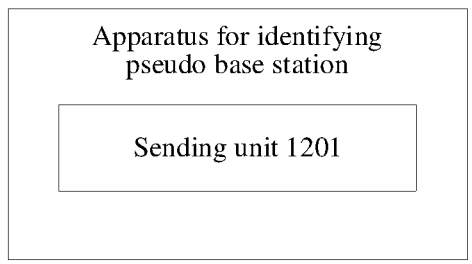
FIG. 12 is a seventh schematic diagram of a structural composition of an apparatus for identifying a pseudo base station according to an embodiment of the present application.

FIG. 12 is a seventh schematic diagram of a structural composition of an apparatus for identifying a pseudo base station according to an embodiment of the present application, which is applied to a network device. As shown in FIG. 12, the apparatus for identifying the pseudo base station includes: a sending unit 1201, configured to send a fourth measurement configuration to a terminal device, wherein the fourth measurement configuration is used for the terminal device to calculate a HASH value of system broadcast information of a cell and record HASH information, and to report the recorded HASH information to the network device; wherein the HASH information is used for the network device to determine whether the cell is a pseudo base station cell.

In an optional embodiment, the fourth measurement configuration includes at least one of: a quantity of cells of which HASH information needs to be recorded, a list of the cells of which HASH information needs to be recorded, frequency information of the cells of which HASH information needs to be recorded, frequency list information of the cells of which HASH information needs to be recorded, a measurement time length, absolute time, indication information of whether to report location information, and indication information of system broadcast information of which a HASH value needs to be calculated.

In an optional embodiment, the indication information of the system broadcast information of which the HASH value needs to be calculated includes a first bitmap; wherein the first bitmap includes a plurality of bits, different bits of the plurality of bits correspond to different pieces of system broadcast information, and values of the bits are used for indicating whether to calculate HASH values of system broadcast information corresponding to the bits.

Those skilled in the art should understand that relevant description of the apparatus for identifying the pseudo base station of the embodiment of the present application may be understood with reference to relevant description of the method for identifying the pseudo base station of the embodiment of the present application.

Figure 13:
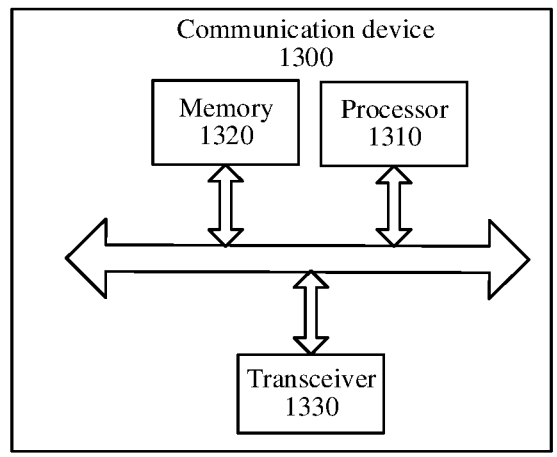
FIG. 13 is a schematic diagram of a structure of a communication device according to an embodiment of the present application.

FIG. 13 is a schematic diagram of a structure of a communication device 1300 according to an embodiment of the present application. The communication device may be a terminal device or a network device. The communication device 1300 shown in FIG. 13 includes a processor 1310, which may call and run a computer program from a memory to implement a method in the embodiment of the present application.

Optionally, as shown in FIG. 13, the communication device 1300 may further include a memory 1320. Herein, the processor 1310 may call and run a computer program from the memory 1320 to implement the method in the embodiment of the present application.

Herein, the memory 1320 may be a separate device independent of the processor 1310, or may be integrated in the processor 1310.

Optionally, as shown in FIG. 13, the communication device 1300 may further include a transceiver 1330, and the processor 1310 may control the transceiver 1330 to communicate with another device. Specifically, the transceiver 1330 may send information or data to another device or receive information or data sent by another device.

Herein, the transceiver 1330 may include a transmitter and a receiver. The transceiver 1330 may further include antennas, a quantity of which may be one or more.

Optionally, the communication device 1300 may be specifically the network device according to the embodiments of the present application, and the communication device 1300 may implement the corresponding processes implemented by the network device in various methods in the embodiments of the present application, which will not be repeated here for brevity.

Optionally, the communication device 1300 may be specifically the mobile terminal/terminal device according to the embodiments of the present application, and the communication device 1300 may implement the corresponding processes implemented by the mobile terminal/terminal device in various methods in the embodiments of the present application, which will not be repeated here for brevity.

Figure 14:
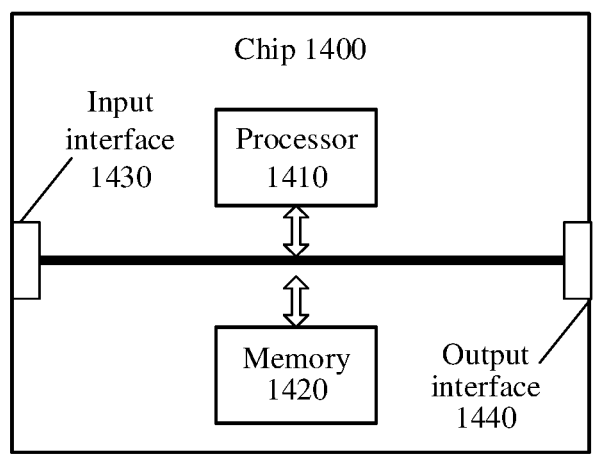
FIG. 14 is a schematic diagram of a structure of a chip according to an embodiment of the present application.

FIG. 14 is a schematic diagram of a structure of a chip according to an embodiment of the present application. The chip 1400 shown in FIG. 14 includes a processor 1410 that may call and run a computer program from a memory to implement a method in the embodiment of the present application.

Optionally, as shown in FIG. 14, the chip 1400 may further include a memory 1420. Herein, the processor 1410 may call and run a computer program from the memory 1420 to implement the method in the embodiment of the present application.

Herein, the memory 1420 may be a separate device independent of the processor 1410, or may be integrated in the processor 1410.

Optionally, the chip 1400 may further include an input interface 1430. Herein, the processor 1410 may control the input interface 1430 to communicate with another device or chip. Specifically, the processor 1410 may obtain information or data sent by another device or chip.

Optionally, the chip 1400 may further include an output interface 1440. Herein, the processor 1410 may control the output interface 1440 to communicate with another device or chip. Specifically, the processor 1410 may output information or data to another device or chip.

Optionally, the chip may be applied to the network device in the embodiments of the present application, and the chip may implement the corresponding flow implemented by the network device in the various methods in the embodiments of the present application, which will not be repeated here for brevity.

Optionally, the chip may be applied to the mobile terminal/terminal device in the embodiments of the present application, and the chip may implement the corresponding flow implemented by the mobile terminal/terminal device in the various methods in the embodiments of the present application, which will not be repeated here for brevity.

It should be understood that the chip mentioned in the embodiments of the present application may also be referred to as a system-level chip, a system chip, a chip system, or a system chip on a chip, etc.

Figure 15:
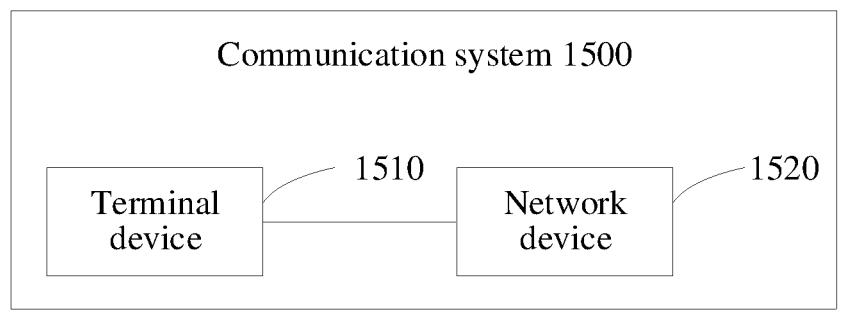
FIG. 15 is a schematic block diagram of a communication system according to an embodiment of the present application.

FIG. 15 is a schematic block diagram of a communication system 1500 according to an embodiment of the present application. As shown in FIG. 15, the communication system 1500 includes a terminal device 1510 and a network device 1520.

Herein, the terminal device 1510 may be used for implementing corresponding functions implemented by the terminal device in the above-mentioned methods, and the network device 1520 may be used for implementing corresponding functions implemented by the network device in the above-mentioned methods, which will not be repeated here for brevity.

It should be understood that the processor in the embodiments of the present application may be an integrated circuit chip with a capability for processing signals. In an implementation process, various acts of the method embodiments described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement or perform various methods, acts, and logical block diagrams disclosed in the embodiments of the present application. The general purpose processor may be a microprocessor, or the processor may also be any conventional processor, or the like. The acts of the methods disclosed in the embodiments of the present application may be directly embodied to be performed by a hardware decoding processor, or may be performed by a combination of hardware and software modules in the decoding processor. The software modules may be located in a storage medium which is mature in the art, such as a Random Access Memory, a flash memory, a Read Only Memory, a Programmable Read Only Memory, or an electrically erasable programmable memory, or a register. The storage medium is located in a memory, and the processor reads information in the memory and completes the acts of the above methods in combination with its hardware.

It should be understood that the memory in the embodiments of the present application may be a transitory memory or a non-transitory memory, or may include both transitory memory and non-transitory memory. The non-transitory memory may be a Read Only Memory (ROM), a Programmable Read Only Memory (PROM), an Erasable Programmable Read Only Memory (EPROM), an Electrically Erasable Programmable Read Only Memory (EEPROM), or a flash memory. The transitory memory may be a Random Access Memory (RAM), which is used as an external cache. As an example, but not as a restriction, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limitations. For example, the memory in the embodiments of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memories in the embodiments of the present application are intended to include, but are not limited to, these and any other suitable types of memories.

An embodiment of the present application further provides a computer readable storage medium configured to store a computer program.

Optionally, the computer readable storage medium may be applied to a network device in an embodiment of the present application, and the computer program enables a computer to perform the corresponding processes implemented by the network device in various methods according to the embodiments of the present application, which will not be repeated here for brevity.

Optionally, the computer readable storage medium may be applied to the mobile terminal/terminal device in the embodiments of the present application, and the computer program enables a computer to perform the corresponding processes implemented by the mobile terminal/terminal device in various methods according to the embodiments of the present application, which will not be repeated here for brevity.

An embodiment of the present application further provides a computer program product, including computer program instructions.

Optionally, the computer program product may be applied to the network device in an embodiment of the present application, and the computer program instructions enable a computer to perform the corresponding processes implemented by the network device in various methods according to the embodiments of the present application, which will not be repeated here for brevity.

Optionally, the computer program product may be applied to the mobile terminal/terminal device in the embodiments of the present application, and the computer program instructions enable a computer to perform the corresponding processes implemented by the mobile terminal/terminal device in various methods according to the embodiments of the present application, which will not be repeated here for brevity.

An embodiment of the present application further provides a computer program.

Optionally, the computer program may be applied to the network device in an embodiment of the present application. When the computer program is run on a computer, the computer is enabled to perform the corresponding processes implemented by the network device in various methods according to the embodiments of the present application, which will not be repeated here for brevity.

Optionally, the computer program may be applied to the mobile terminal/terminal device in the embodiments of the present application. When the computer program is run on a computer, the computer is enabled to perform the corresponding processes implemented by the mobile terminal/terminal device in various methods according to the embodiments of the present application, which will not be repeated here for brevity.

Those of ordinary skill in the art will recognize that units and algorithm acts of various examples described in connection with the embodiments disclosed herein may be implemented in electronic hardware, or a combination of computer software and electronic hardware. Whether these functions are implemented in a form of hardware or software depends on a specific application and a design constraint of a technical solution. Skilled in the art may use different methods to implement the described functions for each particular application, but such implementation should not be considered to be beyond the scope of the present application.

Those skilled in the art may clearly understand that for convenience and conciseness of description, specific working processes of the systems, apparatuses, and units described above may refer to the corresponding processes in the aforementioned method embodiments, and details will not be repeated here.

In several embodiments according to the present application, it should be understood that the disclosed systems, apparatuses, and methods may be implemented in other ways. For example, the apparatus embodiments described above are only illustrative, for another example, a division of the units is only a logical function division, and there may be other division manners in actual implementations. For example, multiple units or components may be combined or integrated into another system, or some features may be ignored or not executed. In addition, mutual coupling or direct coupling or communication connection shown or discussed may be indirect coupling or communication connection between apparatuses or units through some interfaces, and may be in electrical, mechanical, or other forms.

The units described as separated components may or may not be physically separated, and components shown as units may or may not be physical units, i.e., they may be located in one place or may be allocated over multiple network units. Some or all of the units may be selected according to practical needs to achieve purposes of solutions of the embodiments.

In addition, various functional units in various embodiments of the present application may be integrated in one processing unit, or various units may be physically present separately, or two or more units may be integrated in one unit.

The functions may be stored in a computer readable storage medium if implemented in a form of a software functional unit and sold or used as a separate product. Based on this understanding, technical solutions of the present application, in essence, or a part contributing to the existing art, or part of the technical solutions, may be embodied in a form of a software product stored in a storage medium, including several instructions for enabling a computer device (which may be a personal computer, a server, or a network device, etc.) to perform all or part of the acts of the methods described in various embodiments of the present application. And the aforementioned storage medium includes various media, such as a U disk, a mobile hard disk, a Read-Only Memory (ROM), a Random Access Memory (RAM), a magnetic disk, or an optical disk, etc., which may store program codes.

The foregoing are merely specific implementations of the present application, but the protection scope of the present application is not limited thereto. Any variation or substitution that may easily occur to a person skilled in the art within the technical scope disclosed by the present application shall be included within the protection scope of the present application. Therefore, the protection scope of the present application should be subject to the protection scope of the claims.

What is claimed is:

1. A method for identifying a pseudo base station, comprising:
   receiving, by a terminal device, a third measurement configuration sent by a network device, and reporting cell identification information of a first cell and/or a HASH value of system broadcast information of the first cell to the network device based on the third measurement configuration; wherein the cell identification information and/or the HASH value of the system broadcast information is used for the network device to determine whether the first cell is a pseudo base station cell;
   wherein the third measurement configuration further comprises a first bitmap, wherein the first bitmap comprises a plurality of bits, different bits of the plurality of bits correspond to different pieces of system broadcast information, and values of the bits are used for indicating whether to report HASH values of pieces of system broadcast information corresponding to the bits.

2. The method according to claim 1, wherein the third measurement configuration comprises first indication information and second indication information, wherein the first indication information is used for instructing the terminal device to report the cell identification information of the first cell, and the second indication information is used for instructing the terminal device to report the HASH value of the system broadcast information of the first cell;
   wherein the first indication information contains the second indication information.

3. The method according to claim 1, wherein before the receiving, by the terminal device, the third measurement configuration sent by the network device, the method further comprises:
   sending, by the terminal device, a measurement result to the network device, wherein the measurement result is used for the network device to determine whether the first cell is an unconfigured neighbor cell.

4. The method according to claim 1, further comprising:
   reporting, by the terminal device, first capability information to the network device, wherein the first capability information is used for indicating whether the terminal device supports calculation and reporting of a HASH value;
   or,
   reporting, by the terminal device, second capability information and/or third capability information to the network device, wherein the second capability information is used for indicating whether the terminal device supports calculation and/or reporting of a HASH value in a Minimization of Drive Test (MDT) log mode, and the third capability information is used for indicating whether the terminal device supports calculation and reporting of a HASH value in an Automatic Neighbor Relation (ANR) mode.

5. A terminal device, comprising: a processor and a memory, wherein the memory is configured to store a computer program, and the processor is configured to call and run the computer program stored in the memory to perform the method according to claim 1.

6. A method for identifying a pseudo base station, comprising:
   receiving, by a terminal device, a fourth measurement configuration sent by a network device, calculating a HASH value of system broadcast information of a cell based on the fourth measurement configuration, and recording HASH information;
   reporting, by the terminal device, the recorded HASH information to the network device;
   wherein the HASH information is used for the network device to determine whether the cell is a pseudo base station cell; and
   wherein the fourth measurement configuration comprises indication information of system broadcast information of which a HASH value needs to be calculated; the indication information of the system broadcast information of which the HASH value needs to be calculated comprises a first bitmap; wherein the first bitmap comprises a plurality of bits, different bits of the plurality of bits correspond to different pieces of system broadcast information, and values of the bits are used for indicating whether to calculate HASH values of pieces of system broadcast information corresponding to the bits.

7. The method according to claim 6, wherein the fourth measurement configuration further comprises at least one of:
   a quantity of cells of which HASH information needs to be recorded, a list of the cells of which HASH information needs to be recorded, frequency information of the cells of which HASH information needs to be recorded, frequency list information of the cells of which HASH information needs to be recorded, a measurement time length, absolute time, or indication information of whether to report location information.

8. The method according to claim 6, wherein the calculating the HASH value of the system broadcast information of the cell based on the fourth measurement configuration and recording the HASH information comprises:
calculating the HASH value of the system broadcast information of the cell based on the fourth measurement configuration and recording the HASH information in a case where the terminal device is in a Radio Resource Control (RRC) idle state or an RRC inactive state; or,
calculating the HASH value of the system broadcast information of a current resident cell based on the fourth measurement configuration and recording the HASH information after cell reselection in a case where the terminal device is in the RRC idle state or the RRC inactive state.

9. The method according to claim 6, wherein the reporting, by the terminal device, the recorded HASH information to the network device comprises:
indicating to the network device that a recorded HASH value exists in the terminal device in a case where the terminal device is in a Radio Resource Control (RRC) connection state; and
reporting the recorded HASH information to the network device after the terminal device receives a request message sent by the network device.

10. The method according to claim 6, wherein the HASH information recorded by the terminal device comprises at least one of the following:
HASH information of at least one cell, cell identification information corresponding to at least one cell, frequency information of at least one cell, absolute time information, relative time information, and location information.

11. The method according to claim 6, further comprising:
receiving, by a terminal device, system broadcast information sent by a first cell, wherein the system broadcast information comprises at least one code; and
performing, by the terminal device, decryption and/or integrity protection verification of the at least one code by using a public secret key, and determining whether the first cell is a pseudo base station cell based on a decryption result and/or a verification result.

12. The method according to claim 11, further comprising:
reporting, by the terminal device, at least one piece of the following information to the network device if the terminal device determines that the first cell is a pseudo base station cell based on the decryption result and/or the verification result:
frequency information of the first cell, cell identification information of the first cell, cell frequency information before cell reselection, cell identification information before cell reselection, location information, time information, or neighbor cell measurement information.

13. An apparatus for identifying a pseudo base station, which is applied to a terminal device, the apparatus comprising:
a receiver, configured to receive a fourth measurement configuration sent by a network device; and
a processor, configured to calculate a HASH value of system broadcast information of a cell based on the fourth measurement configuration and record HASH information;
wherein the processor is further configured to report the recorded HASH information to the network device;
wherein the HASH information is used for the network device to determine whether the cell is a pseudo base station cell;
wherein the fourth measurement configuration comprises indication information of system broadcast information of which a HASH value needs to be calculated; the indication information of the system broadcast information of which the HASH value needs to be calculated comprises a first bitmap; wherein the first bitmap comprises a plurality of bits, different bits of the plurality of bits correspond to different pieces of system broadcast information, and values of the bits are used for indicating whether to calculate HASH values of pieces of system broadcast information corresponding to the bits.

14. The apparatus according to claim 13, wherein the receiver is configured to receive a Radio Resource Control (RRC) release message sent by the network device, wherein the fourth measurement configuration is carried in the RRC release message.

15. The apparatus according to claim 13, wherein the processor is further configured to stop measuring and/or stop a timer if the processor has recorded HASH information of a specified quantity of cells; or, continue measurement and overwrite previously recorded information based on a measurement result.

16. The apparatus according to claim 13, wherein
the processor is further configured to stop recording information after performing Access Stratum (AS) or Non-Access Stratum (NAS) security verification if the terminal device performs a Radio Resource Control (RRC) establishment procedure or an RRC recovery procedure for a first cell in a process of recording information; and record indication information that the first cell is a pseudo base station if the terminal device fails to perform the RRC establishment procedure or the RRC recovery procedure.

17. The apparatus according to claim 13, wherein
the processor is further configured to report first capability information to the network device, wherein the first capability information is used for indicating whether the terminal device supports calculation and reporting of a HASH value.

18. The apparatus according to claim 13, wherein
the processor is further configured to report second capability information and/or third capability information to the network device, wherein the second capability information is used for indicating whether the terminal device supports calculation and/or reporting of a HASH value in a Minimization of Drive Test (MDT) log mode, and the third capability information is used for indicating whether the terminal device supports calculation and reporting of a HASH value in an Automatic Neighbor Relation (ANR) mode.

19. The apparatus according to claim 13, wherein,
the receiver is configured to receive system broadcast information sent by a first cell, wherein the system broadcast information comprises at least one code; and
the processor is configured to perform decryption and/or integrity protection verification of the at least one code by using a public secret key, and determine whether the first cell is a pseudo base station cell based on a decryption result and/or a verification result.

* * * * *